United States Patent
Avni et al.

(10) Patent No.: US 9,183,595 B1
(45) Date of Patent: Nov. 10, 2015

(54) USING LINK STRENGTH IN KNOWLEDGE-BASED AUTHENTICATION

(75) Inventors: Ayelet Avni, Binyamina (IL); Ayelet Eliezer, Givatayim (IL); Yedidya Dotan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 715 days.

(21) Appl. No.: 13/434,983

(22) Filed: Mar. 30, 2012

(51) Int. Cl.
*G06Q 50/00* (2012.01)

(52) U.S. Cl.
CPC .................................. *G06Q 50/00* (2013.01)

(58) Field of Classification Search
None
See application file for complete search history.

(56) References Cited

U.S. PATENT DOCUMENTS

| 8,412,938 | B2 | 4/2013 | Farrugia et al. | |
|---|---|---|---|---|
| 8,745,738 | B2* | 6/2014 | Xie et al. | 726/22 |
| 2007/0283416 | A1* | 12/2007 | Renaud | 726/2 |
| 2009/0288150 | A1* | 11/2009 | Toomim et al. | 726/5 |
| 2010/0293600 | A1* | 11/2010 | Schechter et al. | 726/4 |
| 2012/0278625 | A1* | 11/2012 | Narayanan et al. | 713/175 |
| 2013/0191887 | A1* | 7/2013 | Davis et al. | 726/5 |

OTHER PUBLICATIONS

Stuart Schechter, Serge Egelman, and Robert W. Reeder. 2009. It's not what you know, but who you know: a social approach to last-resort authentication. In Proceedings of the SIGCHI Conference on Human Factors in Computing Systems (CHI '09). ACM, New York, NY, USA, 1983-1992.*

Toomim, Michael, et al. "Access control by testing for shared knowledge."Proceedings of the SIGCHI Conference on Human Factors in Computing Systems. ACM, 2008.*

* cited by examiner

*Primary Examiner* — Jeffrey A Gaffin
*Assistant Examiner* — David H Kim
(74) *Attorney, Agent, or Firm* — BainwoodHuang

(57) ABSTRACT

An improved technique generates questions to authenticate a user as part of a group. Along these lines, a KBA system, upon receiving a request to authenticate a particular user, collects facts having references to users of the group of users. The collected facts, however, may also include references to users not in the group of users. In building a set of questions for the particular user, the KBA system is capable of favoring facts having references to users of the group of users and few, if any, references to users not in the group of users; conversely, the KBA system is capable of discarding facts having too many references to users not in the group of users. The particular user's responses to the set of questions are indicative of whether the particular user belongs to the group.

20 Claims, 5 Drawing Sheets

56

70

|  | User A | User B | User C | User D | User E | User F |
|---|---|---|---|---|---|---|
| Fact1 | Yes | Yes | Yes | Yes | Yes | Yes |
| Fact2 | Yes | No | Yes | No | Yes | No |
| Fact3 | No | No | No | No | Yes | Yes |
| Fact4 | No | No | No | Yes | No | No |
| Fact5 | Yes | Yes | Yes | Yes | No | No |
| Fact6 | Yes | No | Yes | Yes | Yes | No |
| Fact7 | No | No | No | No | No | No |
| Fact8 | Yes | Yes | Yes | No | No | No |

72

|  | Internal Link Strength (74) | External Link Strength (76) |
|---|---|---|
| Fact1 | 4 | 2 |
| Fact2 | 1 | 1 |
| Fact3 | 0 | 2 |
| Fact4 | 1 | 0 |
| Fact5 | 4 | 0 |
| Fact6 | 3 | 1 |
| Fact7 | 0 | 0 |
| Fact8 | 3 | 1 |

Figure 3

USING LINK STRENGTH IN KNOWLEDGE-BASED AUTHENTICATION

BACKGROUND

In knowledge-based authentication (KBA), an organization questions a user for particular personal information. Such questions may include "when were you married?", "what was the make and model of your first car?", and "what was the name of your first pet?". The user must answer the set of questions correctly in order to prove to the organization that he or she is not an imposter.

Conventional KBA service providers form questions that an organization presents to a particular user based on facts concerning the particular user. To this effect, KBA service providers perform searching operations on facts in a database for instances of a user identifier corresponding to the particular user. The facts resulting from the searching operations are used to form the questions.

Along these lines, suppose that a conventional KBA service provider retrieves facts of multiple users from a Lexis-Nexis® server and stores the facts in a database. Further, suppose that when the KBA service provider later performs an authentication operation on a user having an identifier User P, the KBA service provider retrieves facts stored in the database that are connected to User P. An example of such a fact includes "User P and User Q bought a house in Westborough, Mass. on Mar. 30, 2011 for $355,500 using agent User R." The KBA service provider uses this fact to form questions, such as "On what day did you [User P] purchase your house in Westborough, Mass.?", and "How much was the purchase price of your [User P's] home in Westborough, Mass.?".

SUMMARY

Unfortunately, there are deficiencies with the above-described conventional KBA service providers. For example, a conventional KBA service provider forms questions that are too difficult for a legitimate user to answer. Along the lines of the example described above, User P may have a difficult time remembering the date or the exact purchase price of his or her house. In such a case, there would be a likelihood of User P not receiving the authentication that he deserves.

Moreover, at the same time, the conventional KBA service provider forms questions that are too easy for a fraudulent user to answer. For example, consider that User R was User P's agent for the purchase of his house in Westborough, Mass. User R's circumstances may have changed, and User R is now fraudulently attempting to access personal information belonging to User P. User R may have a better memory of that transaction than User P and is more able to answer questions based on the home purchase facts described above. Furthermore, attempts to ease the difficulty of the questions for User P, such as asking what month he or she purchased the house, may result in the resulting questions being too easy for a fraudulent user such as User R to answer.

A reason why the conventional KBA service provider is unable to better control the level of difficulty of the questions posed to a user lies in the fact that the KBA service provider does not consider connections between a particular user and other users that may or may not share knowledge of certain facts. For example, facts that have too many connections to other users may result in questions that are too easy for when the other users pose as fraudulent users.

Additionally, in many cases an organization presenting questions to a particular user is not interested in authenticating the user as an individual, but rather as a member of a group. This is true for corporate organizations providing access to shared resources belonging to a group of users. Nevertheless, because the conventional KBA service provider does not consider connections between members of the group, the conventional KBA service provider is unable to derive questions to which only the members of the group should know the answers.

In contrast to conventional KBA service providers which have difficulty in forming appropriately challenging questions to users according to specific authentication goals of an organization, an improved technique generates questions to authenticate a user as part of a group. Along these lines, a KBA system, upon receiving a request to authenticate a particular user, collects facts having references to users of the group of users. The collected facts, however, may also include references to users not in the group of users. In building a set of questions for the particular user, the KBA system is capable of favoring facts having references to users of the group of users and few, if any, references to users not in the group of users; conversely, the KBA system is capable of discarding facts having too many references to users not in the group of users. The particular user's responses to the set of questions are indicative of whether the particular user belongs to the group.

Along these lines, suppose that, in addition to the fact cited above, there is another fact stating that "User P and User Q were married in Chapel C in Nashua, N.H." The relationship between User P and User Q is clearly different from that between User P and User R. Suppose further that the authentication is directed to deciding whether to allow User P access to Bank Account X shared by User P and User Q. The bank is more interested in User P being a member of the group "Owners of Bank Account X" than as User P himself. Because the fact "User P and User Q were married in Chapel C in Nashua, N.H." only has references to members of the group "Owners of Bank Account X," this fact is useful for generating questions for User P as a member of that group. In contrast, the fact cited above, because it also has a reference to User R who is not a member of this group, is less useful and perhaps harmful for generating such questions.

Advantageously, the improved technique allows a KBA system to generate well-targeted questions, i.e., questions that result in fewer false positives and false negatives. The KBA system can control a level of difficulty of the questions by examining a number of references between users in a group and a set of facts. The KBA system can further refine this level of difficulty by examining the number of references between users in the group and users outside of the group. While resulting sets of questions generated by the KBA system may be further refined by submitting the questions to a controlled feedback mechanism, reliance of the KBA system on such feedback mechanisms in obtaining well-targeted questions is dramatically reduced.

One embodiment of the improved technique is directed to a method of generating a set of questions in a KBA system. The method includes collecting a set of facts that have references to a population of users. The method also includes receiving a request to authenticate a particular user claiming to belong to a group of users included in the population of users. The method further includes identifying a set of group facts in response to the request, each group fact of the set of group facts being included in the set of facts and having references to users of the group of users. The method further includes generating the set of questions from the set of group facts, responses to questions of the set of questions provided by the particular user being indicative of whether the particular user belongs to the group of users.

Additionally, some embodiments of the improved technique are directed to an apparatus constructed and arranged to generate a set of questions in a KBA system. The apparatus includes a network interface, memory, and a controller including controlling circuitry constructed and arranged to carry out the method of generating a set of questions in the KBA system.

Furthermore, some embodiments of the improved technique are directed to a computer program product having a non-transitory computer readable storage medium which stores code including a set of instructions to carry the method of generating a set of questions in a KBA system.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

FIG. 3 is a block diagram illustrating an example table of links between users and facts in a database within the database server shown in FIG. 2.

DETAILED DESCRIPTION

An improved technique generates questions to authenticate a user as part of a group. Along these lines, a KBA system, upon receiving a request to authenticate a particular user, collects facts having references to users of the group of users. The collected facts, however, may also include references to users not in the group of users. In building a set of questions for the particular user, the KBA system is capable of favoring facts having references to users of the group of users and few, if any, references to users not in the group of users; conversely, the KBA system is capable of discarding facts having too many references to users not in the group of users. The particular user's responses to the set of questions are indicative of whether the particular user belongs to the group.

Advantageously, the improved technique allows a KBA system to generate well-targeted questions, i.e., questions that result in fewer false positives and false negatives. The KBA system can control a level of difficulty of the questions by examining a number of references between users in a group and a set of facts. The KBA system can further refine this level of difficulty by examining the number of references between users in the group and users outside of the group. While resulting sets of questions generated by the KBA system may be further refined by submitting the questions to a controlled feedback mechanism, reliance of the KBA system on such feedback mechanisms in obtaining well-targeted questions is dramatically reduced.

Figure 1:
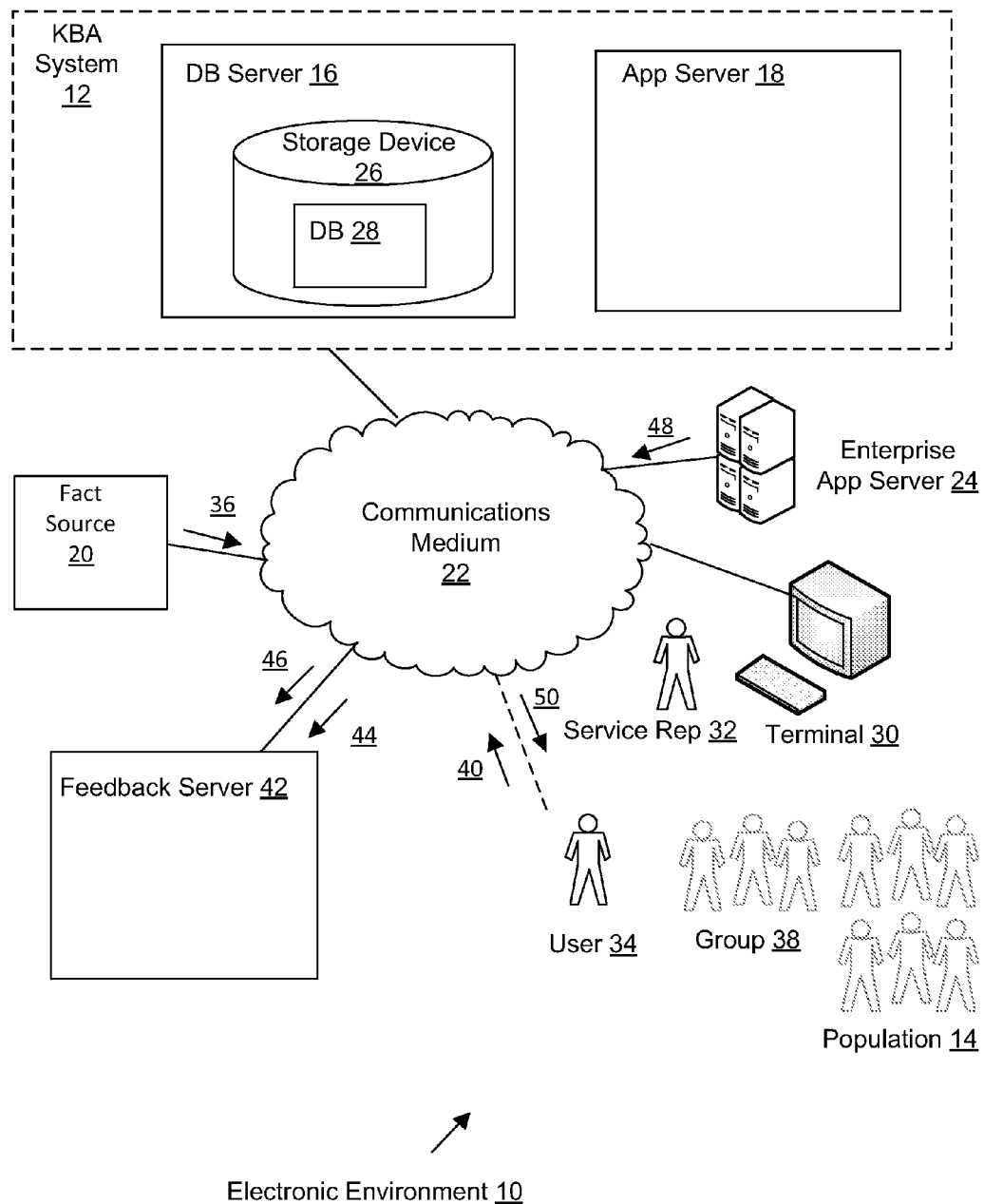
FIG. 1 is a block diagram illustrating an example electronic environment for carrying out the improved technique.

FIG. 1 illustrates an electronic environment 10 for carrying out the improved technique. Electronic environment 10 includes KBA system 12, fact sources 20, feedback server 42, and communications medium 22.

Communication medium 22 provides network connections between KBA system 12, fact source 20, and feedback server 42. Communications medium 22 may implement a variety of protocols such as TCP/IP, UDP, ATM, Ethernet, Fibre Channel, combinations thereof, and the like. Furthermore, communications media 22 may include various components (e.g., cables, switches/routers, gateways/bridges, NAS/SAN appliances/nodes, interfaces, etc.). Moreover, the communications medium 18 are capable of having a variety of topologies (e.g., queue manager-and-spoke, ring, backbone, multi drop, point to-point, irregular, combinations thereof, and so on).

Fact source 20 includes a database in communication with KBA system 12. For example, fact source 20 is a LexisNexis® server. In some arrangements, fact source 20 is remote from KBA server 12; in other arrangements, fact source 20 is in the same location as KBA server 12. In other arrangements, fact source 20 includes multiple sources, e.g., Microsoft Exchange® server, SAP server, etc.

KBA system 12 includes a database server 16 and an application server 18.

Application server 18 is an electronic system in communication with database server 16 and external systems such as enterprise app server 24 that provide an application programming interface (API) for providing questions to user 34. Application server 18 may also be in communication with a NetView terminal 30 at which a service representative 32 provides questions to user 34.

Database server 16 is an electronic system in communication with application server 18. Database server 16 includes storage device 26 on which database 28 is stored.

Database 28 is a database which stores facts in a common format. Database 28 includes entries, each of which represents a fact. The common format is represented by various fields within each entry. In some arrangements, database 28 is a relational database; in other arrangements, database 28 is a NoSQL database.

Feedback server 42 is an electronic system in communication with KBA system 12.

During operation, fact source 20 sends facts 36 to KBA server. In some arrangements, fact source 20 sends facts 36 to KBA system 12 on a regular basis as part of a subscription. In other arrangements, fact source 20 sends facts 36 to KBA system 12 in response to a request sent by KBA server 12.

Database server 16 collects facts 36 upon the arrival of facts 36 at KBA system 12, and stores facts 36 in database 28. It should be understood that facts 36 are specifically formatted for storage in database 12 such that database server 16 may perform database operations on database 28 to find specific values of fields in entries of database 28.

In some arrangements, each entry of database 28 corresponds to a fact 36. In such cases, database server 16 formats facts 36 so that field values are parsed from the fact and stored in a field of the entry. For example, the fact "User P and User Q bought a house in Westborough, Mass. on Mar. 30, 2011 for $355,500 using agent User R" may be parsed into fields User Identifiers ("User P", "User Q", "User R"), Activity ("Purchase"), Object ("House"), Activity Day (30), Activity Month ("March"), Activity Year (2011), Activity Amount ($355,500), and Activity Location ("Westborough, Mass.").

It should be understood, however, that facts 36 that are too old may not form good questions, as users' memories are limited. Further, facts 36 are typically purged for space reasons. Along these lines, facts include a value of a time-to-live (TTL) parameter; this value is stored in a field in the entry of database 28 corresponding to a particular fact 36. When the value of the TTL parameter for the fact 36 exceeds a TTL threshold value (e.g., 12 months), then database server 16 purges fact 36 from database 28 and excludes fact 36 from question building.

Examples below will assume that each entry of database 28 corresponds to a fact 36. In this case, a fact referencing a user means that a user identifier associated with the user is contained in a User Identifier field in an entry of database 28. It should be understood, however, that other database structures are possible for storing and accessing facts.

Some time after database server 16 collects facts 36 in database 28, user 34 submits a request 40, either directly through enterprise app server 24 or via service rep 32, to KBA system 12. Request 40 indicates that user 34 is to be authenticated as part of a group 38 of users, group 38 being a part of a greater population 14 of users that are referenced in the facts 36 stored in database 28.

Upon receiving the request, database server 16 performs a lookup operation on facts 36 in database 28 to find facts that have references to users of group 38. Along these lines, suppose that group 38 includes User P and User Q. Database server 16 finds entries of database 28 having User Identifier field values equal to "User P" or "User Q." One of the facts selected in the lookup operation could be "User P and User Q bought a house in Westborough, Mass. on Mar. 30, 2011 for $355,500 using agent User R."

Database server 16 then generates questions from the selected facts and sends the questions to app server 18 for storage and analysis. App server 18 ranks the questions according to a set of rules, and sends a set of questions 48 based on the ranking either to user 34 via enterprise app server 24, or to service rep 32 via NetView terminal 30. User 34 sends responses 50 to the set of questions 48 back to KBA system 12, whereupon app server 18 analyzes solutions 18 and generates an authentication result based on the analysis.

In some arrangements, database server 16 excludes facts 36 having references to users not belonging to a group. Along these lines, suppose that, in addition to the fact cited above, there is another fact stating that "User P and User Q were married in Chapel C in Nashua, N.H." The relationship between User P and User Q is clearly different from that between User P and User R. Suppose further that the authentication is directed to deciding whether to allow User P access to Bank Account X shared by User P and User Q. The bank is more interested in User P being a member of the group "Owners of Bank Account X" than as User P himself. Because the fact "User P and User Q were married in Chapel C in Nashua, N.H." only has references to members of the group "Owners of Bank Account X," this fact is useful for generating questions for User P as a member of that group. In contrast, the fact cited above, because it also has a reference to User R who is not a member of this group, is less useful and perhaps harmful for generating such questions.

In some arrangements, user 34 is known to be a legitimate or a fraudulent user. KBA system 12 sends authentication results, including false positive results 44 (in which user 34 being a fraudulent user results in a favorable authentication result) and false negative results 46 (in which user 34 being a legitimate user results in an unfavorable authentication result), to feedback server 42 for a feedback operation. Along these lines, feedback server 42 performs machine learning operations such as neural network iterations in order to generate a refined set of rules for app server 18 to apply to questions built by database server 16.

Further details about the question building processes are discussed below with respect to FIGS. 2, 3, and 4.

Figure 2:
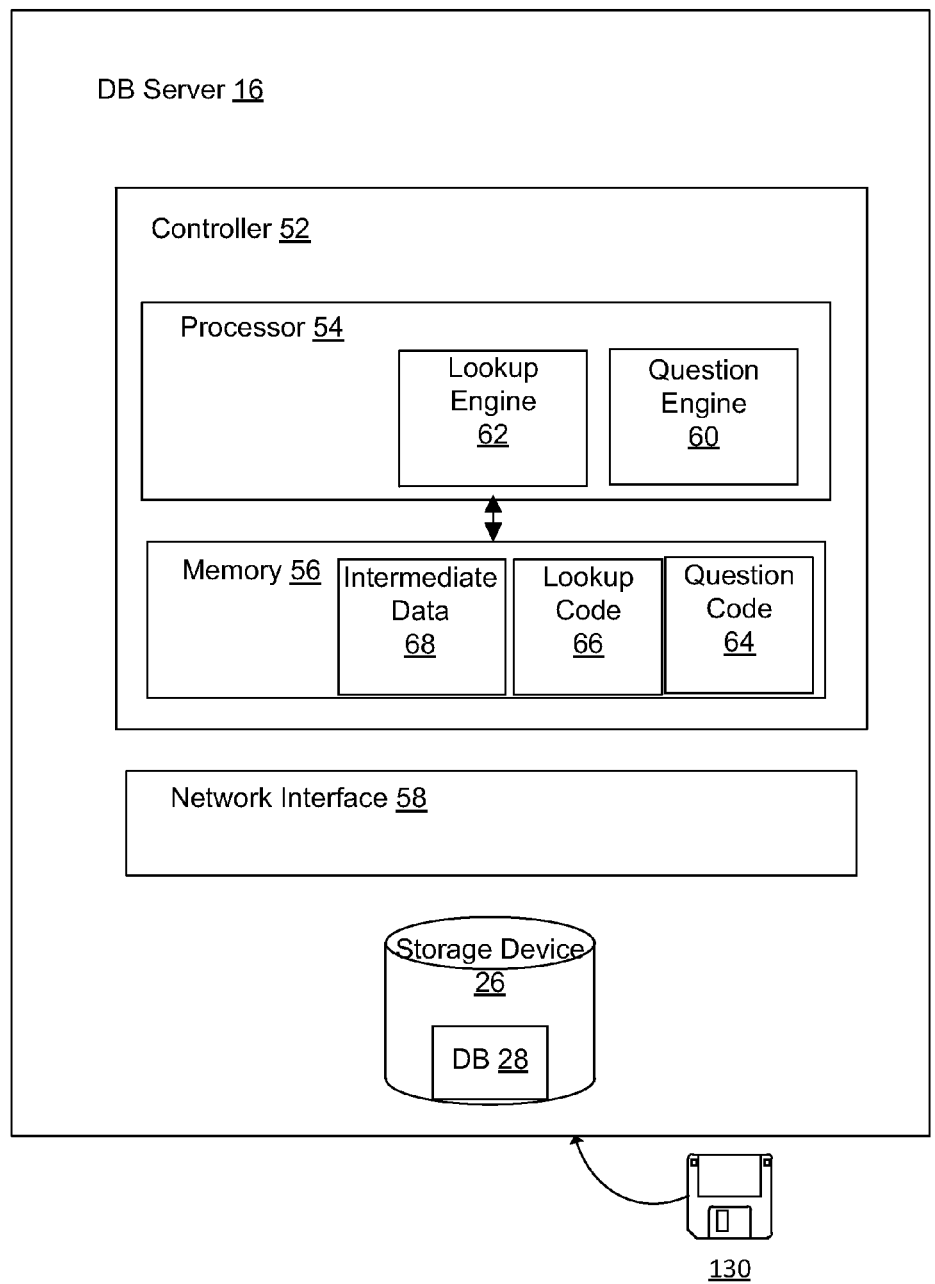
FIG. 2 is a block diagram illustrating an example database server within the electronic environment shown in FIG. 1.

FIG. 2 illustrates further details of database server 16. In addition to storage device 26, database server 16 includes controller 52, which in turn includes processor 54 and memory 56, and network interface 58.

Network interface 58 takes the form of an Ethernet card; in some arrangements, network interface 58 takes other forms including a wireless receiver and a token ring card.

Memory 56 is configured to store code which includes question code 62 configured to generate a set of questions from facts 36 (see FIG. 1) stored in database 28. Memory 56 also includes space for intermediate data 64, in which intermediate results of question building are stored. Memory 56 generally takes the form of, e.g., random access memory, flash memory or a non-volatile memory.

Processor 54 takes the form of, but is not limited to, Intel or AMD-based MPUs, and can include a single or multi-cores each running single or multiple threads. Processor 54 is coupled to memory 56 and is configured to execute instructions from question code 64 and lookup code 66. Processor 54 includes question engine 60 and lookup engine 62.

During operation, network interface 58 receives facts 36 and places then in the space for intermediate data 64 in memory 56. Processor 54 parses facts 36 into field values as described above and stores the field values in database 28.

Some time later, network interface 58 receives request 40 indicating that user 34 is to be authenticated as part of a group 38. Upon receiving request 40, lookup engine 62 performs a lookup operation on database 28, returning to memory 56 indices of entries of database 28 corresponding to facts having values of the User Identifier field equal to user identifiers corresponding to users of group 38. Further details of the results of the lookup process are shown with respect to FIG. 3.

FIG. 3 illustrates table representing results of the lookup process stored in memory 46. Table 70 is a link table representing a table of references, or links, between facts 36 and users from population 14. Table 72 is a link strength table representing link strengths between facts 36 and users from population 14. For both tables 70 and 72, group 38 includes User A, User B, User C, and User D. The facts 36 include Fact1 through Fact 8, each represented as an entry in tables 70 and 72.

Link table 70 represents the relationship between facts 36, users of group 38, and users of user population 14. Note that user population 14 includes group 38, User E, and User F. For each fact 36, link table 60 shows whether there is a reference to each user of group 38 (no background) or other users of user population 14 (shaded background). For example, Fact1 has references to all users of user population 14, including all users of group 38. In contrast, Fact5 has references to all users of group 38 and no other users.

Link strength table 72 represents how many users to whom each fact refers. Specifically, link strength table 72 includes fields for an internal link strength 74, which refers to how many users of group 38 are referred to by a fact, and an external link strength 76, which refers to how many users outside of group 38 are referred to by a fact. To continue the example above, Fact1 has an internal link strength of 4 (all 4 users of group 38 have a reference in Fact1) and an external link strength of 2 (the other 2 users in population 14 and not in group 38 have a reference in Fact1). In contrast, Fact5 has an internal link strength of 4 (all 4 users of group 38 have a reference in Fact5) and an external link strength of 0 (no 2 users in population 14 and not in group 38 have a reference in Fact1).

Database server 16 uses link strength table 72 in building the set of questions 48 for user 34. Along these lines, database server 16 favors entries in link strength table 72 that have a large value of internal link strength 74 and a small value of external link strength 76. For example, database server 16 forms a set of weights corresponding to each fact used in building questions. In some arrangements, database server 16 generates the set of weights from a difference between internal link strength 74 and external link strength 76. In this way, questions that are known to too many users not in group 38 are excluded from question building.

In some arrangements, however, additional analysis is needed. For example, it may be important to know more detail about the relationships between various users of user population 14 and group 38 in order to determine the role of the various facts 36 in building questions. An example of such detail is shown with respect to FIG. 4.

Figure 4:
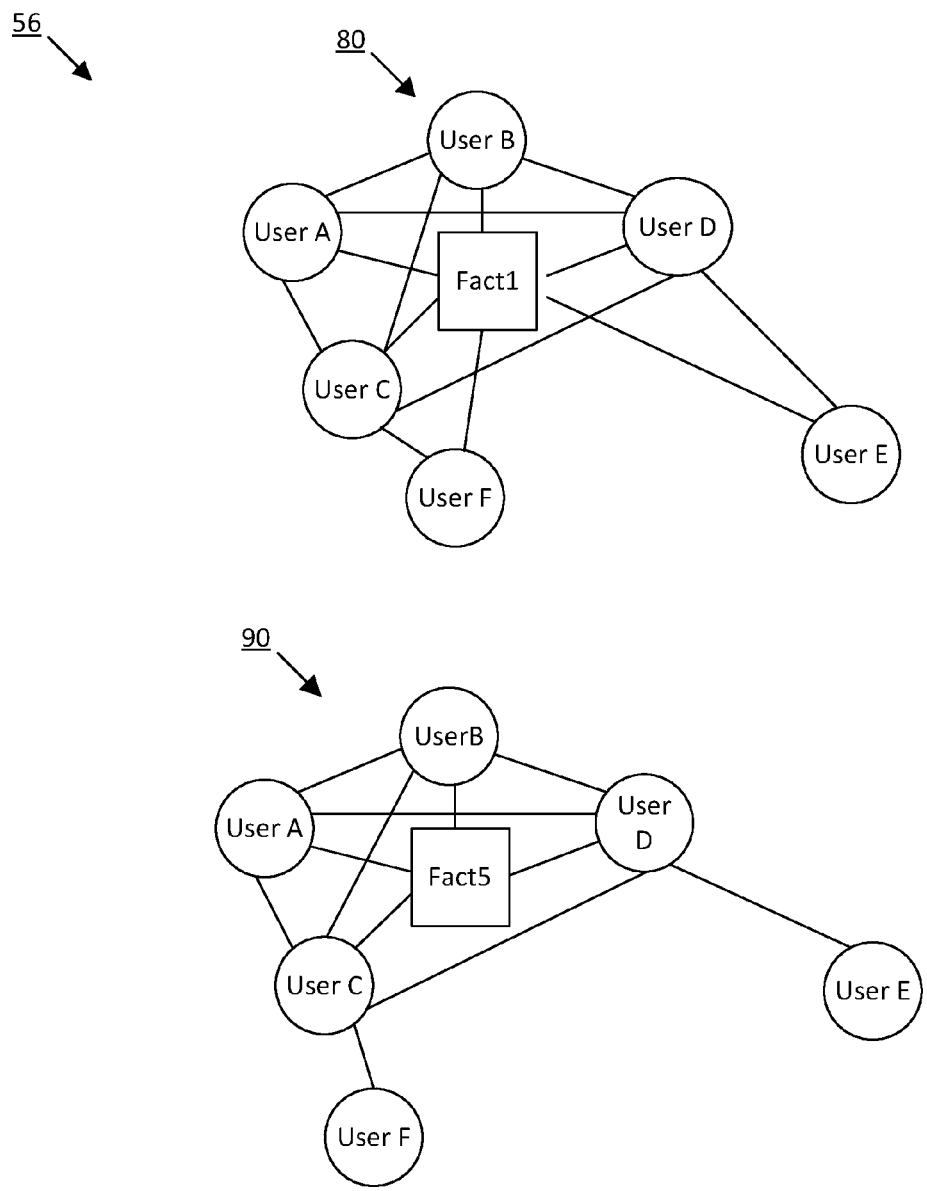
FIG. 4 is a block diagram illustrating example graphs representing relationships between users for selected facts in the database shown in FIG. 3.

FIG. 4 illustrates graphs 80 and 90 which represent example relationship details between various users for facts Fact1 and Fact5, respectively.

Graph 80 is a graph of various relationships between the users User A, User B, User C, User D, User E, and User F as described with respect to the example above. Graph 80 is an example of a graph generated using a force-based algorithm, in which the users are represented as nodes and relationships between users are represented as edges. In graph 80, each user has an edge connecting its respective node to a node representing Fact1; this reflects the fact that, for Fact1, there is a reference to each user of population 14. Further, in force-based algorithms, each node and edge are modeled as being subject to various physical laws; for example, each edge can be thought of as a spring subject to Hooke's law, and each vertex can be thought of as a charge subject to Coulomb's law, although other physical laws may be used in drawing a graph. By calibrating the parameters of the graph to known data (e.g., using appropriate values of charges and spring constants), a force-based algorithm can draw a graph which, in equilibrium, accurately represents the "closeness" of users and the impact of that closeness on question building.

Along these lines, suppose that group 38 represents members of a team within an organization that regularly attends a series of meetings, and Fact1 represents a particular instance of the series of meetings (e.g., a meeting on a particular day not too long ago). Members of the team all were at this particular meeting (or had knowledge of it through a calendar entry). It should be clear that each member of the team knows each other. These references are each represented by an edge, or a line connecting the various nodes. Further, members not in group 38, i.e., User E and User F, are referenced in Fact1 and have respective edges drawn to the node representing Fact1. User E also has a connection to User D, and User F has a connection to User C. For example, User E shares a cubicle with User D and has been invited this one time to the meeting, while User F is User C's supervisor with a meeting invite as well. Those relationships may be characterized by particular values of charges and spring constants in the forced-base algorithm for drawing graph 80.

It should be understood that "connections" between two users in this context means a number of facts mentioning both users. Lookup engine 62 performs periodic lookup operations to determine this numbers of connections between pairs of users of the population 14 and stores these numbers in database 28. Processor 54 then accesses these numbers from database 28 when building a graph in response to request 40. A decision to include Fact1 in question building involves comparing a minimum distance between nodes representing users belonging to group 38 and users not belonging to group 38 to an external distance threshold; if the minimum distance is less than the external distance threshold, Fact1 is excluded from question building.

Question engine 60 builds questions taking into account distances between various nodes in graph 80. Along these lines, users in group 38 are all close to each other and to Fact1, and therefore have a strong relationship with each other and Fact1. User F is also close to User C and Fact1; it could be inferred that User F knows whatever User C knows about Fact1. It may be inferred that including facts referencing User F then could be risky. User E, on the other hand, although connected, is far from User D, meaning that there are probably few connections between User C and User D other than by sharing a cubicle. In such a case, it may be a relatively low risk to include facts involving User E, despite User E not belonging to group 38.

Graph 90, on the other hand, shows these relationships but with User E and User F having no references to Fact5, but having the same relationships as described with respect to graph 80. In this case, while the risk may be lower of User E and User F knowing information regarding group 38, the existence of the connections to User D and User C, respectively, makes determining whether to include Fact5 in question building nontrivial.

Figure 5:
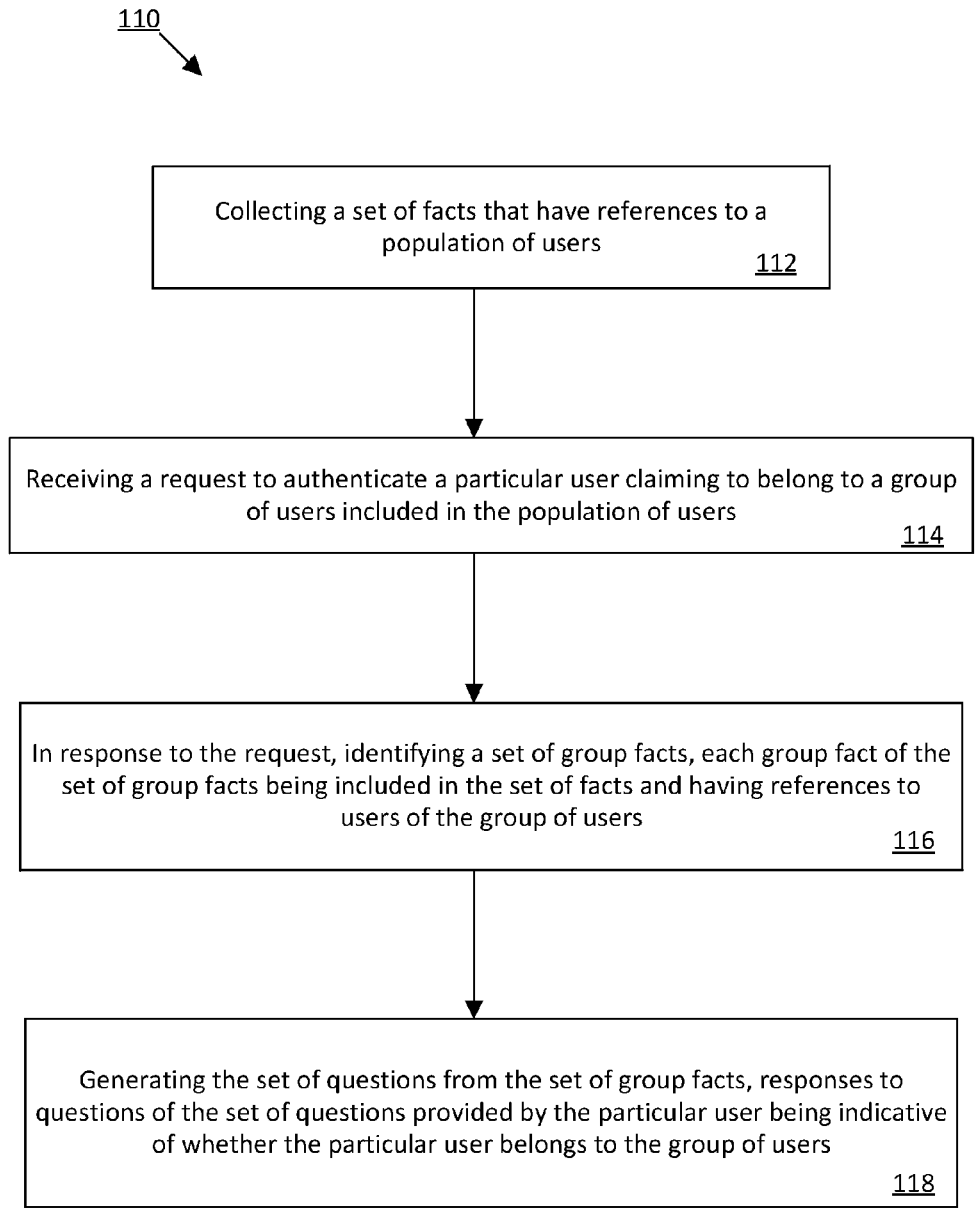
FIG. 5 is a flow chart illustrating a method of carrying out the improved technique within the electronic environment shown in FIG. 1.

FIG. 5 illustrates a method 110 of generating a set of questions in a KBA system. In step 112, a set of facts that have references to a population of users is collected. In step 114, a request to authenticate a particular user claiming to belong to a group of users included in the population of users is received. In step 116, a set of group facts is identified in response to the request, each group fact of the set of group facts being included in the set of facts and having references to users of the group of users. In step 118, the set of questions is generated from the set of group facts, responses to questions of the set of questions provided by the particular user being indicative of whether the particular user belongs to the group of users.

While various embodiments of the invention have been particularly shown and described, it will be understood by those skilled in the art that various changes in form and details may be made therein without departing from the spirit and scope of the invention as defined by the appended claims.

For example, the feedback server 42 can be a part of an adaptive authentication system including a risk engine.

Furthermore, it should be understood that some embodiments are directed to KBA system 12 which is, constructed and arranged to provide a set of questions. Some embodiments are directed to a process of providing a set of questions in a KBA system. Also, some embodiments are directed to a computer program product which enables computer logic to provide a set of questions in a KBA system.

In some arrangements, KBA system is implemented by a set of processors or other types of control/processing circuitry running software. In such arrangements, the software instructions can be delivered, within KBA system 12, respectively (see FIG. 2), as well as to database server 16 in the form of a computer program product 130, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. In a knowledge-based authentication (KBA) system, a method of generating a set of questions, the method comprising:

collecting a set of facts that have references to a population of users;

receiving a request to authenticate a particular user claiming to belong to a group of users included in the population of users;

in response to the request, identifying a set of group facts, each group fact of the set of group facts being included in the set of facts and having references to users of the group of users; and generating the set of questions from the set of group facts, responses to questions of the set of questions provided by the particular user being indicative of whether the particular user belongs to the group of users;

wherein generating the set of questions from the set of group facts includes:
  for each group fact of the set of group facts, producing an internal link strength that represents a number of users of the group of users referenced by that group fact;
  using a group fact of the set of group facts to produce a question of the set of questions when the internal link strength for the group fact is greater than a threshold internal link strength; and
  not using the group fact in producing questions of the set of questions when the internal link strength for the group fact is less than the threshold internal link strength.

2. A method according to claim 1,
wherein collecting the set of facts includes:
  for each fact of the set of facts, generating a link table of users of the population of users to which the fact has a reference, and
wherein identifying the set of group facts includes:
  finding the facts of the set of facts for which the link table includes users of the group of users.

3. A method according to claim 2,
wherein generating the set of questions from the set of group facts further includes:
  for each group fact of the set of group facts, producing an external link strength that represents a difference between the number of users in the link table and the number of users of the group of users in the link table;
  using the group fact in producing questions of the set of questions when the external link strength is less than a threshold external link strength; and
  not using the group fact in producing questions of the set of questions when the external link strength is greater than the threshold external link strength.

4. A method according to claim 2,
wherein collecting the set of facts includes:
  for each fact of the set of facts, using a force-based algorithm to produce a set of nodes of a graph representing the users of the population of users in the link table;
wherein generating the set of questions from the set of group facts includes:
  for each group fact of the set of group facts, excluding the group fact in producing questions of the set of questions when a minimum distance between nodes representing users of the group of users and other nodes is less than an external distance threshold.

5. A method according to claim 1,
wherein each fact of the set of facts includes a value of a time-to-live (TTL) parameter;
wherein the method further includes:
  excluding the fact in producing questions of the set of questions when the value of the TTL parameter exceeds a threshold TTL value.

6. A method according to claim 1,
wherein the method further comprises:
  performing a feedback operation on the responses to the questions of the set of questions, output of the first feedback operation including a set of false negative results and a set of false positive results, and
wherein generating a set of questions from the set of group facts includes:
  using the set of false negative results and the set of false positive results to generate a likelihood of a question inducing a false negative response or a false positive response; and
  including or excluding the question in the set of questions based on the likelihood.

7. In a knowledge-based authentication (KBA) system, an apparatus constructed and arranged to generate a set of questions, the apparatus comprising:
  a network interface;
  memory; and
  a controller including controlling circuitry coupled to the memory, the controlling circuitry being constructed and arranged to:
    collect a set of facts that have references to a population of users;
    receive a request to authenticate a particular user claiming to belong to a group of users included in the population of users;
    in response to the request, identify a set of group facts, each group fact of the set of group facts being included in the set of facts and having references to users of the group of users; and
  generate the set of questions from the set of group facts, responses to questions of the set of questions provided by the particular user being indicative of whether the particular user belongs to the group of users;
  wherein generating the set of questions from the set of group facts includes:
    for each group fact of the set of group facts, producing an internal link strength that represents a number of users of the group of users referenced by that group fact;
    using a group fact of the set of group facts to produce a question of the set of questions when the internal link strength for the group fact is greater than a threshold internal link strength; and
    not using the group fact in producing questions of the set of questions when the internal link strength for the group fact is less than the threshold internal link strength.

8. An apparatus according to claim 7,
wherein collecting the set of facts includes:
  for each fact of the set of facts, generating a link table of users of the population of users to which the fact has a reference, and
wherein identifying the set of group facts includes:
  finding the facts of the set of facts for which the link table includes users of the group of users.

9. An apparatus according to claim 8,
wherein generating the set of questions from the set of group facts further includes:
  for each group fact of the set of group facts, producing an external link strength that represents a difference between the number of users in the link table and the number of users of the group of users in the link table;
  using the group fact in producing questions of the set of questions when the external link strength is less than a threshold external link strength; and
  not using the group fact in producing questions of the set of questions when the external link strength is greater than the threshold external link strength.

10. An apparatus according to claim 8,
wherein collecting the set of facts includes:

for each fact of the set of facts, using a force-based algorithm to produce a set of nodes of a graph representing the users of the population of users in the link table;

wherein generating the set of questions from the set of group facts includes:

for each group fact of the set of group facts, excluding the group fact in producing questions of the set of questions when a minimum distance between nodes representing users of the group of users and other nodes is less than an external distance threshold.

11. An apparatus according to claim 7, wherein each fact of the set of facts includes a value of a time-to-live (TTL) parameter;

wherein the method further includes:

excluding the fact in producing questions of the set of questions when the value of the TTL parameter exceeds a threshold TTL value.

12. An apparatus according to claim 7, wherein the controlling circuitry is further configured to:

perform a feedback operation on the responses to the questions of the set of questions, output of the first feedback operation including a set of false negative results and a set of false positive results, and wherein generating a set of questions from the set of group facts includes:

using the set of false negative results and the set of false positive results to generate a likelihood of a question inducing a false negative response or a false positive response; and including or excluding the question in the set of questions based on the likelihood.

13. In a knowledge-based authentication (KBA) system, a computer program product having a non-transitory, computer-readable storage medium which stores code to generate a set of questions, the code including instructions to:

collect a set of facts that have references to a population of users;

receive a request to authenticate a particular user claiming to belong to a group of users included in the population of users;

in response to the request, identify a set of group facts, each group fact of the set of group facts being included in the set of facts and having references to users of the group of users; and generate the set of questions from the set of group facts, responses to questions of the set of questions provided by the particular user being indicative of whether the particular user belongs to the group of users;

wherein generating the set of questions from the set of group facts includes:

for each group fact of the set of group facts, producing an internal link strength that represents a number of users of the group of users referenced by that group fact;

using a group fact of the set of group facts to produce a question of the set of questions when the internal link strength for the group fact is greater than a threshold internal link strength; and not using the group fact in producing questions of the set of questions when the internal link strength for the group fact is less than the threshold internal link strength.

14. A computer program product according to claim 13, wherein collecting the set of facts includes:

for each fact of the set of facts, generating a link table of users of the population of users to which the fact has a reference, and wherein identifying the set of group facts includes:

finding the facts of the set of facts for which the link table includes users of the group of users.

15. A computer program product according to claim 14, wherein generating the set of questions from the set of group facts further includes:

for each group fact of the set of group facts, producing an external link strength that represents a difference between the number of users in the link table and the number of users of the group of users in the link table;

using the group fact in producing questions of the set of questions when the external link strength is less than a threshold external link strength; and not using the group fact in producing questions of the set of questions when the external link strength is greater than the threshold external link strength.

16. A computer program product according to claim 14, wherein collecting the set of facts includes:

for each fact of the set of facts, using a force-based algorithm to produce a set of nodes of a graph representing the users of the population of users in the link table;

wherein generating the set of questions from the set of group facts includes:

for each group fact of the set of group facts, excluding the group fact in producing questions of the set of questions when a minimum distance between nodes representing users of the group of users and other nodes is less than an external distance threshold.

17. A computer program product according to claim 13, wherein each fact of the set of facts includes a value of a time-to-live (TTL) parameter;

wherein the method further includes:

excluding the fact in producing questions of the set of questions when the value of the TTL parameter exceeds a threshold TTL value.

18. In a knowledge-based authentication (KBA) system, a method of generating a set of questions, the method comprising:

collecting a set of facts that have references to a population of users;

receiving a request to authenticate a particular user claiming to belong to a group of users included in the population of users;

in response to the request, identifying a set of group facts, each group fact of the set of group facts being included in the set of facts and having references to users of the group of users; and generating the set of questions from the set of group facts, responses to questions of the set of questions provided by the particular user being indicative of whether the particular user belongs to the group of users;

wherein collecting the set of facts includes arranging, by a processor of the KBA system, the set of facts in a database having a set of entries, each entry of the set of entries including a set of user identifier field values, each user identifier field value of the set of user identifier field values being an identifier of a user of the population of users; and wherein identifying the set of group facts in response to the request includes performing, by the processor, a lookup operation on the facts arranged in the database to locate entries of the set of entries having at least one user identifier field value equal to a user identifier identifying a user belonging to the group of users.

19. In a knowledge-based authentication (KBA) system, an apparatus constructed and arranged to generate a set of questions, the apparatus comprising:

a network interface;
memory; and
a controller including controlling circuitry coupled to the memory, the controlling circuitry being constructed and arranged to:
  collect a set of facts that have references to a population of users;
  receive a request to authenticate a particular user claiming to belong to a group of users included in the population of users;
  in response to the request, identify a set of group facts, each group fact of the set of group facts being included in the set of facts and having references to users of the group of users; and
  generate the set of questions from the set of group facts, responses to questions of the set of questions provided by the particular user being indicative of whether the particular user belongs to the group of users;
wherein collecting the set of facts includes arranging the set of facts in a database having a set of entries, each entry of the set of entries including a set of user identifier field values, each user identifier field value of the set of user identifier field values being an identifier of a user of the population of users; and
wherein identifying the set of group facts in response to the request includes performing a lookup operation on the facts arranged in the database to locate entries of the set of entries having at least one user identifier field value equal to a user identifier identifying a user belonging to the group of users.

20. In a knowledge-based authentication (KBA) system, a computer program product having a non-transitory, computer-readable storage medium which stores code to generate a set of questions, the code including instructions to:
  collect a set of facts that have references to a population of users;
  receive a request to authenticate a particular user claiming to belong to a group of users included in the population of users;
  in response to the request, identify a set of group facts, each group fact of the set of group facts being included in the set of facts and having references to users of the group of users; and
generate the set of questions from the set of group facts, responses to questions of the set of questions provided by the particular user being indicative of whether the particular user belongs to the group of users;
  wherein collecting the set of facts includes arranging the set of facts in a database having a set of entries, each entry of the set of entries including a set of user identifier field values, each user identifier field value of the set of user identifier field values being an identifier of a user of the population of users; and
  wherein identifying the set of group facts in response to the request includes performing a lookup operation on the facts arranged in the database to locate entries of the set of entries having at least one user identifier field value equal to a user identifier identifying a user belonging to the group of users.

\* \* \* \* \*